May 26, 1931.         C. A. NORGREN         1,806,983
AIR CHUCK
Filed Feb. 4, 1929
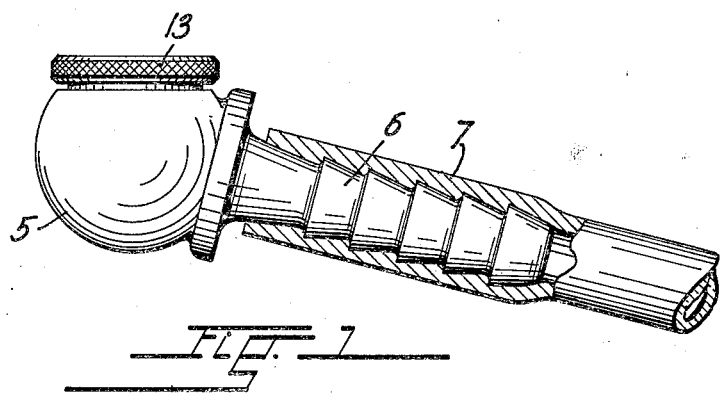
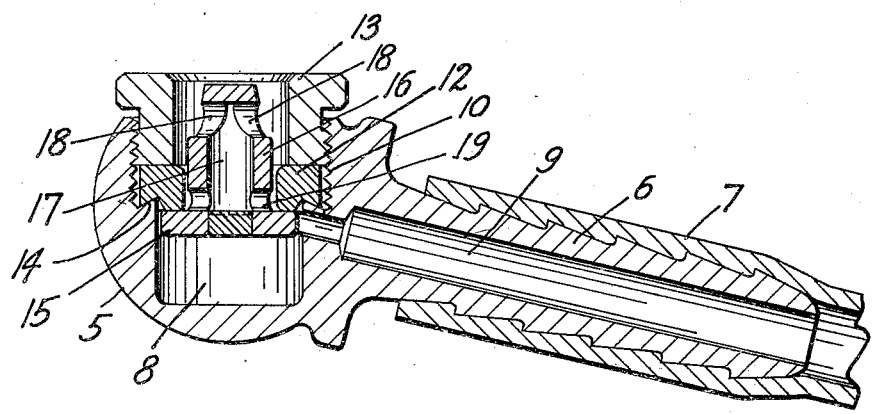
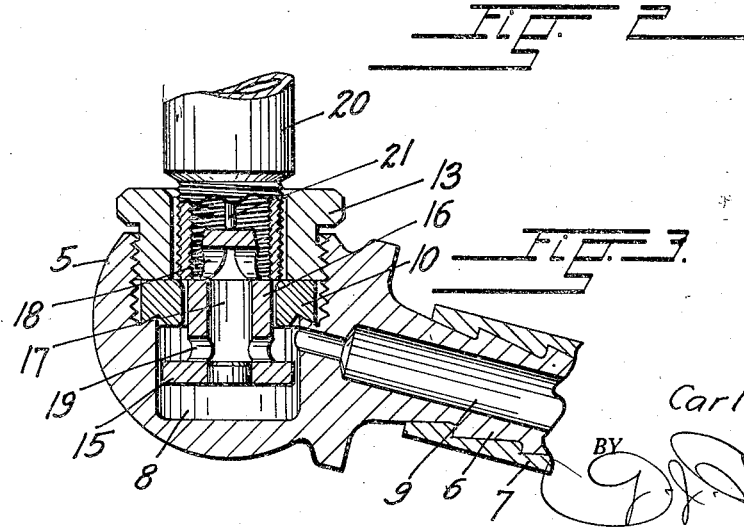
INVENTOR.
Carl. A. Norgren
BY
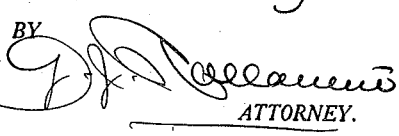
ATTORNEY.

Patented May 26, 1931

1,806,983

UNITED STATES PATENT OFFICE

CARL A. NORGREN, OF DENVER, COLORADO

AIR CHUCK

Application filed February 4, 1929. Serial No. 337,498.

This invention relates to air chucks of the kind commonly used for the supply of air under pressure to pneumatic tires of motor driven vehicles.

It frequently occurs in the use of chucks of this type that the resilient material of the valve gaskets, especially when the latter become worn, enters the nipple through which the air is admitted to the tire, thereby restricting and at times entirely obstructing the passage of the air to the interior of the tire.

It is an object of the present invention to provide in a chuck, a novel arrangement of gasket and valve that effectively eliminates the above stated objectionable feature of chucks used heretofore, and provides a constantly open, unrestricted and non-chokeable passage for the air from a source of supply with which the chuck is connected, to the nipple of the tire to which the chuck is applied, irrespective of the condition of the gasket.

Other objects reside in details of construction and a novel arrangement of parts as will appear in the course of the following description.

In the accompanying drawings in the several views of which like parts have been similarly designated, Figure 1 represents a side elevation of the improved chuck in connection with a hose by means of which it is connected with a source of air supply, Figure 2, a sectional elevation of the chuck, drawn to an enlarged scale, and Figure 3, a fragmentary view, similar to Figure 2, showing the chuck in operative relation to the nipple of a tire to which it is applied.

The chuck consists of a hollow body 5 provided with a ribbed shank 6 for its attachment to a hose 7 which connects the chuck with a source of air supply.

A valve chamber 8 in the chuck connects with the longitudinal bore 9 of the shank and it opens into an enlarged interiorly screw-threaded space that provides a chamber 10 for an annular valve gasket 12 and a hollow gland 13.

The shoulder 14 between the two chambers upon which the gasket is seated, is beveled inwardly to provide a recess into which the outer portion of the gasket may enter under pressure. The inner portion of the annular gasket projects over the edge of the shoulder into the packing chamber 10 and beyond the inner edge of the bore of the gland.

A valve 15 movable in the valve chamber, is normally held in engagement with the projecting portion of the gasket by the air pressure in the source of supply with which the chuck is connected, and the stem 16 of the valve extends loosely through the opening of the gasket and into the opening of the gland.

The stem of the valve is hollow to provide an air duct 17 which connects with ports 18 and 19 at opposite ends of the stem.

When the chuck is not in use the air in its valve chamber presses the valve 15 against the projecting portion of the gasket which is screwed into air-tight contact with the shoulder 14 between the chambers, by the screw-threaded gland 13. This prevents the escape of air.

When the chuck is applied to a tire nipple shown at 20 in Figure 3, the end of the nipple entering the bore of the gland, engages with the portion of the gasket projecting beyond the shoulder into the chamber 10, and the stem 21 of the valve in the nipple engages with the solid end of the stem of the chuck-valve. The end of this stem is for this purpose, made flat as shown.

The contact of the end of the nipple with the gasket establishes an air tight connection between the interior of the tire and the chamber of the chuck and the engagement of the stem of the tire-valve with the end of the stem of the valve 15, moves the latter away from its seat on the gasket, as shown in Figure 3.

When the valve 15 is separated from its seat, its interior duct and the ports at opposite ends thereof, establish communication between the valve chamber connected with the source of supply, and the interior of the tire nipple, the valve in which has been removed from its seat by contact with the valve of the chuck. Air is thus permitted to pass from the source into the tire as long as the chuck is applied to the nipple as shown and described.

As soon as the chuck is separated from the nipple, the air pressure returns the valve to its original position in contact with the gasket and the escape of air is shut off as before.

It will be observed that the tire valve is forced upon by its contact with the chuck valve so that it is not dependent entirely upon the air pressure to separate it from its seat while the chuck is applied to the nipple of the tire.

When the nipple enters the opening of the gland of the chuck it immediately envelops the stem of the chuck valve and thereby protects the ports thereof within the packing chamber against the admission of foreign matter.

The ports of the valve within the chamber 8, are moved away from the gasket and it will thus be seen that it is impossible for parts of the gasket to enter the ports or duct of the chuck valve, in any condition whatsoever.

The chuck is thus at all times in condition for the free and unrestricted flow of air from the source of supply with which it is connected to the tire-nipple to which it is applied.

What I claim and desire to secure by Letters Patent is:

1. In an air chuck having a chamber, and means to connect the chamber with a source of air supply, an annular gasket projecting into the chamber and a valve engaging the gasket within the chamber and having a stem projecting through the gasket, the stem having an interior duct and ports at opposite ends thereof, said stem between the ports being of a length greater than the thickness of said gasket whereby to locate the ports on opposite sides of the gasket when the valve is opened there being a space around the stem through which a nipple may be admitted into the chuck, and means comprising an annular shoulder on the stem below the outer ports, and engageable with the nipple to prevent entrance of foreign matter into the nipple.

2. In an air chuck having a chamber and means to connect the chamber with a source of air supply, an annular gasket projecting into the chamber and a valve engaging the gasket within the chamber and having a stem projecting through the gasket, the stem having an interior duct and ports spaced on said stem for location at opposite sides of the gasket when the valve is opened, there being a space around the stem through which the nipple may be admitted for engagement with the gasket, and means comprising an annular shoulder on the stem below the outer ports, and engageable with the nipple to prevent entrance of foreign matter into the nipple, said shoulder and said gasket being relatively spaced for simultaneous engagement by the nipple when the valve is in open position.

3. In an air chuck having inner and outer chambers, an annular gasket therebetween and projecting into the chambers and a valve engaging the gasket in the inner chamber and having a hollow stem extending through the gasket provided with ports at opposite sides of the gasket when the valve is opened, said stem being spaced from the inner wall of the chambers to admit a nipple to the projecting portion of the gasket, and means to prevent entrance of foreign matter into the nipple comprising a shoulder on the stem below the outer port and engageable with the nipple.

4. In an air chuck having inner and outer chambers, an annular gasket therebetween and projecting into the chambers and a valve engaging the gasket in the inner chamber and having a hollow stem extending through the gasket provided with ports at opposite sides of the gasket when the valve is opened, said stem being spaced from the inner wall of the chambers to admit a nipple to the projecting portion of the gasket, and means to prevent entrance of foreign matter into the nipple comprising a shoulder on the stem below the outer port and engageable with the nipple, said stem having a portion in advance of the outer port to engage a tire valve located within the nipple.

In testimony whereof I have affixed my signature.

CARL A. NORGREN.